United States Patent
Reade

[15] 3,679,791
[45] July 25, 1972

[54] PROCESS FOR SHRINKING FILM

[72] Inventor: Grahame Melvin Reade, Harpenden, England

[73] Assignee: Imperial Chemical Industries Limited, London, England

[22] Filed: Feb. 20, 1970

[21] Appl. No.: 12,994

Related U.S. Application Data

[62] Division of Ser. No. 627,449, March 31, 1967, Pat. No. 3,570,052.

[52] U.S. Cl. ...................... 264/342 RE, 264/234, 264/342 R
[51] Int. Cl. ........................................................ B29c 25/00
[58] Field of Search .................... 264/288, 289, 290, 342 RE, 264/235, 284, 234; 18/9, 10; 26/18.6

[56] References Cited

UNITED STATES PATENTS

| | | | |
|---|---|---|---|
| 2,301,222 | 11/1942 | Minich | 264/342 |
| 2,812,550 | 11/1957 | Chavannes | 264/235 |
| 2,952,033 | 9/1960 | Goodwin | 264/342 RE |
| 3,246,365 | 4/1966 | Kloender | 264/284 |
| 3,313,002 | 4/1967 | Wyeth | 18/10 |
| 3,416,188 | 12/1968 | Tukuma et al. | 264/290 N |
| 3,525,787 | 8/1970 | McDermott | 264/284 |

*Primary Examiner*—Jay H. Woo
*Attorney*—Cushman, Darby & Cushman

[57] ABSTRACT

Heat-treating oriented film by feeding it to at least one matt surfaced rotating roll which is maintained at a temperature at which the film will shrink but below the melting point of the film and forcing the film against the roll while uniformly spreading it out on the roll.

12 Claims, 2 Drawing Figures

PATENTED JUL 25 1972

3,679,791

INVENTOR
GRAHAME MELVIN READE

By Cushman, Darby & Cushman
ATTORNEYS

PROCESS FOR SHRINKING FILM

This is a division of application Ser. No. 627,449, filed Mar. 31, 1967, now U.S. Pat. No. 3,570,052.

This invention relates to an improved process for heat-treating an oriented film of an organic thermoplastic, crystallizable polymeric material and to the films obtained by the improved process.

When a film of an organic thermoplastic, crystallizable polymeric material, such as polypropylene, is drawn to cause molecular orientation therein and thereby bring about an improvement in its physical properties, the resulting film will normally have, for many applications, an undesirably high shrinkage at elevated temperatures. Proposals have been made for improving the dimensional stability at elevated temperatures of such films by processes known in the art as heat setting operations. Further, when a tubular process has been used to cause biaxial orientation of the film, the drawn films frequently exhibit sag, by which is meant variations in the lengthwise dimensions of the film, for which geometrical factors and thermal non-uniformity in the drawing process are believed to be responsible. Film containing sag will not lie upon a flat surface without wrinkling. By heat setting such films in a stenter, the lateral restraint imposed on the film by the stenter clips may be used to flatten the film, so that the sag is reduced or even eliminated. However, film heat set in this way is prevented from undergoing any contraction in the longitudinal direction once its edges have been gripped by the stenter clips. This may lead to several undesirable consequences. For example, if the film is to be used for heat sealing purposes it may cockle under the sealer. Further, when the film is required to be coated and the coating is dried on the film in a stenter breaks may occur in the film, seemingly due to the longitudinal tensions set up therein. When attempts are made to solve this problem by overfeeding the film to the stenter and allowing some longitudinal shrinkage to occur before the stenter clips grip the film, it is difficult to control accurately the position at which the film is initially gripped.

It is an object of the present invention to provide an apparatus and process whereby oriented film of an organic thermoplastic crystalline polymeric material may be heat-treated so as to become substantially sag-free or wrinkle-free and, if desired, have a low thermal shrinkage in both directions.

Accordingly we provide an apparatus and process for treating oriented films as hereinafter defined of an organic thermoplastic, crystallizable or crystalline polymeric material which comprises feed and take off means for the film between which means is at least one matt surfaced rotating roll maintained at a temperature (below the melting point of the film) which would cause the film to shrink, means to force the film onto at least one of the rolls and means whereby the film is spread uniformly on at least one of the rolls onto which the film is forced.

By an oriented film we mean a film which has been drawn to induce orientation of the molecules in the material of which the film is made. Orientation may be effected by drawing the film in one direction to induce molecular orientation in that direction or by drawing it biaxially in two directions to induce biaxial orientation in the plane of the film, normally the longitudinal and transverse directions. In the case of biaxially drawn film, the longitudinal and transverse draw may be carried out simultaneously or in sequence and the amount of draw in each of these directions may be the same or it may be greater in one direction, as is convenient or appropriate.

Our apparatus and process is suitable for the treatment of oriented films of any organic thermoplastic crystallizable or crystalline polymeric material, e.g. polymers and copolymers of $\alpha$-olefines, for example of high density polyethylene, of polypropylene, of ethylene/propylene copolymers, of poly-4-methyl pentene-1, of polyesters such as polyethylene terephthalate and polyethylene-1:2-diphenoxyethane 4:4′-dicarboxylate, and of the various nylons. The normal heat-treating temperatures of these polymers are used. Thus, for the heat-treatment of polypropylene film, suitable ranges of operating temperatures for the heated matt surface rolls are 100°–145° C for the production of substantially shrink-free film. A very suitable operating temperature for polypropylene film is 120° C. If the apparatus and process is used to smooth oriented film and remove sag and not to heat-treat it to produce substantially shrink-free film lower operating temperatures are used.

A wide variety of matt surfaced rolls may be used, thus they may be grit blasted mild steel rolls, cast iron rolls, aluminum rolls and matt painted rolls. Very suitable degrees of mattness are a mattness showing a center line average as specified in British Specification 1134 of 1950 of 40–200.

Many ways of forcing the film onto the roll will be appreciated by the equipment designer. The simplest way of achieving this is to use relatively small diameter rolls; when using small rolls the tension applied by the feed and take-off means will cause a force between the film and the roll. For this method of operation rolls of 6 inches diameter are suitable and this method of operation has the advantage that the rolls may be idler rolls providing there is not too large a number of such rolls between the feed and take-off means.

When larger diameter rolls are used, it will be appreciated that the tension of the film does not force the film onto the roll over appreciable portions of the circumference of the rolls. Again, many methods will be appreciated for forcing the film onto the rolls to overcome this problem. A very simple way of effecting this, and our preferred way, is by imposing an electrostatic charge on the side of the film away from the roll. To do this, the roll should be in electrical communication with the earth and the electric charge may be applied by a wire, a knife edge or a line of needles which should extend across the width of the film and is preferably placed near the point where the film naturally first contacts the heated matt surfaced roll. For ease of threading, this source of electric charge should not be too close to the heated matt surfaced roll. On the other hand, it should not be too far from this roll or the potential to which it has to be raised may be unduly high. We find that a very satisfactory distance for a wire from the heated matt surfaced roll is 1 inch, the wire being 18 thousandth of an inch diameter, the wire preferably being at a potential in the range of about 10–17 kilovolts.

The equipment designer will also appreciate that there are a wide variety of ways for spreading the film uniformly on the roll. There are, for example, spreader roll systems which may be applied to the film before it contacts the heated matt surfaced roll, for example the rolls known as banana or bow rolls. The film may also be spread on the rolls by means of soft material pressing on the film when it is on the heated matt surfaced roll. This soft material is preferably itself on an idler roll which rotates with the film. The soft material should be thermally resistant. A very satisfactory soft material is polyether foam and we prefer to use rollers coated with polyether foam. When the apparatus is not in motion carrying film being treated and the matt surfaced rolls are hot the soft material should normally be taken out of contact with these rolls so that the soft material is not thermally degraded. When the film is forced onto the roll by means of an electrostatic charge we prefer that the means whereby the film is spread uniformly on the roll follows the source of electrostatic charge and is in the form of a soft surface material pressing the film towards the roll. This causes optimum conditions of uniform treatment to the film.

It will be appreciated that for high rates of operation the film will require a relatively long travel in order to effect an adequate degree of treatment. To achieve this, our apparatus and process may rely upon one large heated matt surfaced roll. We, however, prefer, for economy in engineering, to use a number of such rolls. In such operation when small diameter heated matt surfaced rolls are used, it is not necessary for a means whereby the film is spread uniformly on the roll to effect the first roll; it is sufficient for it to effect only the second roll but it is preferable that the means whereby the film is spread uniformly on the roll should effect both the first and the second roll. Where large diameter heated matt surfaced rolls are used, it is necessary for the means whereby the film is spread uniformly on the roll to effect the first roll and it is preferable that one applies to the subsequent rolls also. When the film is forced onto the first roll by means of an electrostatic charge, it is not necessary to charge the film again when it contacts the subsequent rolls. The subsequent rolls should, of course, be in electrical communication with the earth in order that the charge on the film is best utilized.

When larger diameter rolls are used the temperature and speed of travel of the rolls may be adjusted to any suitable value. In order to minimize the tensions remaining in the film after the treatment according to the present invention, we have found that it is preferable to allow the film to shrink, at least in its direction of orientation during the treatment. Thus if more than one roll is used, as is preferred, the relative peripheral speeds of adjacent rolls may be varied to allow shrinkage of the film in the longitudinal direction. The matt surface of the rolls allows the film to shrink on the rollers. The degree of transverse shrinkage is controlled by the temperature of the roll, the degree of orientation of the film in the transverse direction and the magnitude of the force which is forcing the film onto the roll.

When an electrostatic charge is used to force the film onto the roll or rolls the film may be discharged for safety reasons as it leaves the apparatus. It should at least be discharged before it is wound up, again for safety reasons.

The film should be cooled before it is wound up and a cooling means, e.g. a cooling roll, may be part of the apparatus and is conveniently part of the take-off means.

FIGS. 1 and 2 are schematic representations of cross-sectional elevations of two roll systems within our invention.

Figure 1:
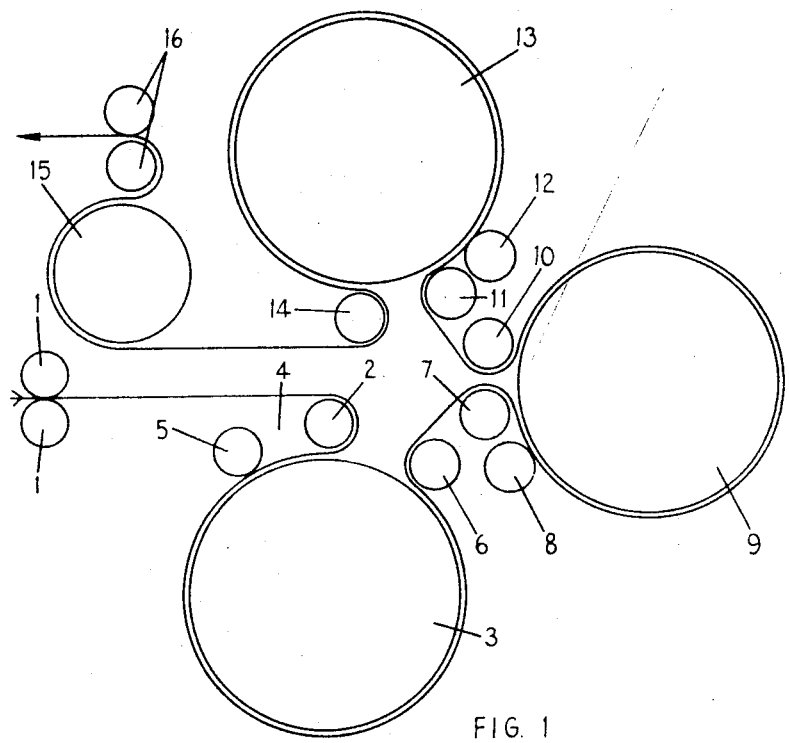
FIGS. 1 and 2 illustrate two forms of our apparatus and process. It will be appreciated that many different designs of apparatus are within our invention.

In FIG. 1 the film is fed through a nip roll system 1, round an idler roll 2, onto a heated matt surfaced roll 3, under an electrically charged wire 4 at its point of contact with roll 3, and under a polyether foam coated roll 5 which presses the film onto roll 3 and is placed immediately after wire 4. It then passes round idler rollers 6 and 7, under polyether foam coated roll 8, onto heated matt surfaced roll 9, round idlers 10 and 11, under polyether foam coated roll 12, onto heated matt surfaced roll 13, round idler 14 and cooled roll 15 which forms a take-off nip roll system with rolls 16. The rate of circumferential movement of nip roll 1, roll 3 and roll 9; roll 13 and nip roll system 15/16 decreases progressively. This allows for longitudinal shrinkage of the film on the heated matt surfaced rolls 3 and 13 and, to some extent, in the air spaces between these rolls and the cooled roll 15. Transverse shrinkage of the film occurs primarily on the surface of heated matt surfaced rolls 3, 9 and 13. The product of film treated by this apparatus and process may be a high quality sag-free film and, if desired, low shrink film. The degree of shrinkage is controlled by the temperature of rolls 3, 9 and 13 and longitudinally by the differential circumferential movement of the rolls and transversely by the electrostatic force pressing the films against the rolls 3, 9 and 13 imposed by wire 4.

Figure 2:
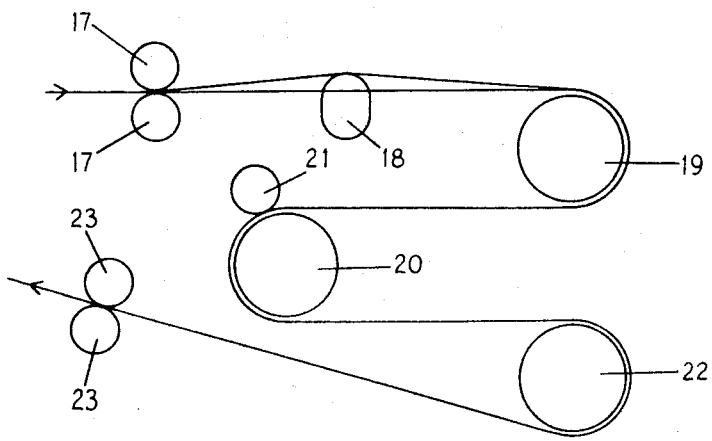

In FIG. 2, 17 is a nip roll for feeding the film to the apparatus, 18 is a bowed or banana roll, 19 and 20 are 6" diameter heated matt surfaced idler rolls, 21 is a polyether foam coated roll which presses the film onto a heated matt surfaced idler roll 20 where it first contacts roll 20, 22 is a 6" diameter cooled idler roll which is preferably also matt surfaced and 23 is a take-off pair of nip rolls. In this form of apparatus and process shrinkage is controlled by the temperature of matt surfaced rolls 19 and 20, and by the relative speed of rotation of feed and take-off nip rolls 17 and 23. It will be appreciated that this apparatus and process is a much simpler one than that described and illustrated by FIG. 1. The quality of film produced by this apparatus and process is at least sufficient when the film is to be coated by a process involving stenter drying.

The present invention is illustrated but in no way limited by reference to the accompanying examples.

EXAMPLE 1

A biaxially oriented polypropylene film 0.00043" thick having an area shrinkage of 16 percent and 68½ inches wide, which had been prepared by the well known tubular process was fed to an apparatus of the type illustrated in FIG. 1 of the accompanying drawings. The nip rolls 1 were rotating at a peripheral speed of 194 ft./minute; roll 3 was rotating at 184 ft./minute and had a surface temperature of 120° C; roll 9 was rotating at a peripheral speed of 178 ft./minute and had a surface temperature of 120° C; roll 13 was rotating at a peripheral speed of 183 ft./minute and had a surface temperature of 116° C and the film was withdrawn from the apparatus by nip rolls 16 rotating at a peripheral speed of 180 ft./minute. The wire 4 was at a potential of 13 kilovolts.

The film obtained was 60 inches wide, 0.0005" thick and had an area shrinkage of 2.2 percent at 120° C.

EXAMPLE 2

A biaxially oriented film of an ethylene/propylene copolymer film 68½" wide which had been prepared by the well known tubular process was fed to an apparatus of the type shown in FIG. 1 of the accompanying drawings. The nip rolls 1 were rotating at a peripheral speed of 124 ft./minute; roll 3 was rotating at a peripheral speed of 116 ft./minute and had a surface temperature of 122° C; roll 9 was rotating at 114 ft./minute and had a surface temperature of 126° C and roll 13 was rotating at 115 ft./minute and had a surface temperature of 120° C and the film was withdrawn from the apparatus by nip rolls 16 rotating at a peripheral speed of 115 ft./minute. The wire 4 was at a potential of 11 kilovolts.

The film obtained was 59 inches wide and had an area shrinkage of 2.6 percent at 120° C.

The "area shrinkage" of a film at a certain temperature is the sum of the linear shrinkages of the film in the longitudinal and transverse directions when it is heated to that certain temperature for one minute.

I claim:

1. A process for treating oriented films of an organic thermoplastic crystallizable or crystalline polymeric material which comprises feeding the film to a roller system comprising at least one matt surfaced rotating roll, uniformly spreading the film out onto at least one of said matt surfaced rolls, forcing the film onto at least that roll on which it is uniformly spread out, maintaining the roll or rolls at a temperature below the melting point of the film which would cause the film to shrink, allowing the film to shrink transversely relative to the axis of said roll or rolls and withdrawing the shrunk film after its passage around at least part of the surface of said roll or rolls.

2. A process according to claim 1 wherein the roller system includes a plurality of matt surfaced rolls and in which it is the first matt surfaced rotating roll that the film contacts onto which the film is forced and on which the film is uniformly spread out.

3. A process according to claim 1 in which the film is fed successively to three matt surfaced rolls.

4. A process according to claim 1 in which the film is uniformly spread out on each of a plurality of the matt surfaced rolls.

5. A process according to claim 1 in which the film is forced on to each of a plurality of the matt surfaced rolls.

6. A process according to claim 1 in which the organic thermoplastic crystalline polymeric material comprises a polymer or copolymer of an α-olefine.

7. A process according to claim 6 in which the α-olefine comprises propylene.

8. A process according to claim 6 in which the copolymer comprises a copolymer of ethylene and propylene.

9. A process according to claim 1 in which the temperature of the surface of the roll or rolls is maintained in the range 100° to 145° C.

10. A process as in claim 1 in which the forcing of the film onto the roll is effected electrostatically by imposing an electrostatic potential between the film and the roll.

11. A process for controlling the transverse and longitudinal shrinkage of an oriented film of an organic thermoplastic crystallizable or crystalline polymeric material during heat treatment comprising: feeding the film in sequence to a plurality of heated rotatably mounted rolls the surfaces of which are maintained at a temperature below the melting point of the film so as to heat the film when the latter passes in contact with the rolls and thereby cause the film to tend to shrink, each of said rolls having a matt surface which permits the film to shrink when in contact therewith; driving said rolls at progressively decreasing speeds so as to permit a controlled shrinkage of the film in its longitudinal direction; forcing the film onto at least one of said matt-surfaced rolls to control the transverse shrinkage of the film on that roll; uniformly spreading the film on the roll onto which the film has been forced; and cooling the film after passing over said rolls.

12. A process as in claim 11 in which the forcing of the film onto the roll is effected electrostatically by imposing an electrostatic potential between the film and the roll.

* * * * *

UNITED STATES PATENT OFFICE
CERTIFICATE OF CORRECTION

Patent No. 3,679,791    Dated July 25, 1972

Inventor(s) Grahame Melvin Reade

It is certified that error appears in the above-identified patent and that said Letters Patent are hereby corrected as shown below:

In the heading, line 30 was omitted and should appear as follows:

[30]  Foreign Application Priority Data

April 15, 1966    Great Britain    16602/66

Signed and sealed this 18th day of December 1973.

(SEAL)
Attest:

EDWARD M. FLETCHER, JR.    RENE D. TEGTMEYER
Attesting Officer    Acting Commissioner of Patents